United States Patent
Wilke et al.

(10) Patent No.: US 7,414,740 B2
(45) Date of Patent: Aug. 19, 2008

(54) METHOD AND APPARATUS FOR CONTACTLESS OPTICAL MEASUREMENT OF THE THICKNESS OF A HOT GLASS BODY BY OPTICAL DISPERSION

(75) Inventors: Thorsten Wilke, Alzey (DE); Andre Witzmann, Waldershof (DE); Rupert Fehr, Mitterteich-Pleussen (DE); Johann Faderl, Nieder-Hilbersheim (DE); Otmar Schmittel, Hamm (DE); Ernst-Walter Schaefer, Welgesheim (DE); Christopher Fritsch, Mainz-Kastel (DE)

(73) Assignee: Schott AG, Mainz (DE)

(*) Notice: Subject to any disclaimer, the term of this patent is extended or adjusted under 35 U.S.C. 154(b) by 365 days.

(21) Appl. No.: 11/180,063

(22) Filed: Jul. 13, 2005

(65) Prior Publication Data
US 2006/0012804 A1    Jan. 19, 2006

(30) Foreign Application Priority Data
Jul. 17, 2004    (DE) .................. 10 2004 034 693

(51) Int. Cl.
*G01B 11/06*    (2006.01)
*G01B 11/28*    (2006.01)
*G01J 3/28*    (2006.01)
*G01N 21/55*    (2006.01)

(52) U.S. Cl. .................. 356/632; 356/326; 356/445; 356/630

(58) Field of Classification Search .................. None
See application file for complete search history.

(56) References Cited

U.S. PATENT DOCUMENTS

| | | | | |
|---|---|---|---|---|
| 3,591,293 A | * | 7/1971 | Maltby et al. ............... 356/5.01 |
| 5,056,923 A | * | 10/1991 | Ebisawa et al. ............. 356/632 |
| 5,396,080 A | * | 3/1995 | Hannotiau et al. ..... 250/559.28 |
| 5,437,702 A | | 8/1995 | Burns et al. |
| 6,188,079 B1 | * | 2/2001 | Juvinall et al. ......... 250/559.27 |
| 6,666,094 B1 | * | 12/2003 | Sauerland ..................... 73/618 |
| 2007/0052978 A1 | * | 3/2007 | Pingel et al. ................. 356/632 |

FOREIGN PATENT DOCUMENTS

DE    10325942    1/2005
FR    2751068    1/1998

* cited by examiner

*Primary Examiner*—Gregory J. Toatley, Jr.
*Assistant Examiner*—Gordon J Stock, Jr.
(74) *Attorney, Agent, or Firm*—Michael J. Striker

(57) ABSTRACT

The method measures the thickness of a hot glass body without direct contact with the glass body and is based on chromatic aberration. This method includes focusing a light beam from a light source on the hot glass body using a focusing device immediately after formation; conducting reflected light from the glass body into a spectrometer to obtain a reflected light spectrum; finding two wavelengths of the reflected light from the front side and the rear side of the glass body respectively at which reflected light intensities are maximum; determining the thickness of the glass body from the difference between the two wavelengths; maintaining the focusing device at a temperature below 120° C. during the measuring of the thickness and substantially preventing heat radiation from reaching the focusing device using at least one heat-blocking filter.

16 Claims, 2 Drawing Sheets

METHOD AND APPARATUS FOR CONTACTLESS OPTICAL MEASUREMENT OF THE THICKNESS OF A HOT GLASS BODY BY OPTICAL DISPERSION

CROSS-REFERENCE

The invention disclosed and claimed herein below is also disclosed in German Patent Application 10 2004 034 693.3, which was filed on Jul. 17, 2004 in Germany. The aforesaid German Patent Application provides the basis for a claim of priority of invention for the invention disclosed and claimed herein below under 35 U.S.C. 119 (a) to (d).

BACKGROUND OF THE INVENTION

1. Field of the Invention

The present invention relates to a method and apparatus for optical measurement of the thickness of a hot glass body by means of optical dispersion or chromatic aberration without direct contact with it immediately after its manufacture while it is still in a hot state.

2. Related Art

Certain dimensions must be maintained during production of glass bodies. Generally these dimensions are specified by the customer and may not exceed or fall below certain predetermined tolerance limits.

Currently exact measurements of the glass thickness are frequently made at the end of the cooling path, because the glass surface can be damaged by an earlier measurement with mechanical sensors and because contactless measurement does not work with hot glass. Thus e.g. laser triangulation is ruled out, since air schlieren produced by the hot glass distorts the optical path. Ultrasonic measurements are unusable, since they require a coupling medium between the glass and the ultrasonic source. White light interferometry does not operate under the rough production conditions. Confocal microscopy coupled with an auto-focus system is very expensive costing several hundred thousand euros for each measurement direction.

However measurement of the glass thickness as early as possible is desired since the amount of faulty products produced is smaller, the earlier the faults on the production line are detected and eliminated.

That can lead to considerable advantages in production, since production for each product can last up to several hours, until the product has reached the end of the cooling path, the so-called "cold end", and thus until the measured values, which are required for correction at the hot end, are available.

SUMMARY OF THE INVENTION

It is an object of the present invention to provide a method and apparatus for measurement of the thickness of a glass body, with which the thickness of the glass body can be measured already in the hot glass body immediately after manufacture ("at the hot end") with a high precision.

This object, and others which will be made more apparent hereinafter, are attained by the method and apparatus claimed in the appended claims.

According to the invention the method of measuring a thickness of a glass body without direct contact with the glass body immediately after formation of the glass body is based on optical dispersion or chromatic aberration and comprises the steps of:

a) focusing a light beam from a polychromatic light source on the glass body by means of a focusing device immediately after forming the glass body;

b) when the light beam is focused on the glass body, conducting reflected light from the glass body into a spectrometer in order to obtain a spectrum of the reflected light;

c) finding two wavelengths of the reflected light reflected from the front side and the rear side of the glass body respectively in the spectrum obtained in step b) at which reflected light intensities are greater than remaining wavelengths in the spectrum;

d) determining the thickness of the glass body from a wavelength difference of the two wavelengths of higher intensity, considering a refractive index of the glass body;

e) maintaining the focusing device at a temperature below 120° C. during the measuring of the thickness; and f) substantially preventing heat radiation from acting on the focusing device by means of at least one heat-blocking filter.

The process according to the invention makes use of the already known phenomenon of light dispersion during refraction by a lens or by passage through a diffractive material to measure layer thickness or spacing. No single focal point results during focusing of white light, but instead each color or wavelength has its own focus or focal point on the optical or beam axis. In other words the focal points of the separate colors are found on a portion of the beam or optic axis. Chromatic aberration is suppressed in photography by combining several lenses of different glass, since color fringes in pictures are unwanted. The term "chromatic aberration" means the optical phenomenon, in which light of different wavelengths (i.e. colors) is strongly refracted differently by a lens or corrective objective. In contrast this process can be used for thickness measurement. The length of the part of the optic or beam axis on which the individual focal points are found. depends on the lens that is used and its material. With a lens with a focus range of 22 cm to 25 cm, a glass thickness of up to about 3 cm can be measured. A polychromatic generally white light beam is conducted through a glass fiber optic cable into a focusing device (measuring head or light pen) and from there into a glass body in this well known method. On account of the chromatic imaging properties of the optics different wavelengths are focused at different distances from the optics. If a boundary surface (e.g. a transition between air and glass) is found at a focal point for a certain wavelength, this special wavelength will be strongly reflected. That means that the reflected light intensity is at a maximum for that wavelength. All other wavelengths would be reflected back more weakly and form a weak diffuse background within the reflectance spectrum. The reflected light passes through the focusing device into the glass fiber optic cable and is conducted into a spectrometer. There the strongly reflected wavelengths are detected as intensity maxima in the spectrum.

There are always two intensity maxima resulting in the case of a transparent glass body, since a reflection occurs at the outer or rear side (the farther side from the measuring head) and the inner or front side (the side closest to the measuring head) of the glass body. The wall thickness can be directly determined from a simple difference of the spaced signals in the spectrum, considering the index of refraction of the glass to be measured. Measuring apparatuses, which are based on the above-described principle of chromatic aberration, are generally known. These measuring apparatuses can be obtained commercially, e.g. from Precitec Optronic GmbH, Rodgau, Germany under the name CHR 150 E. Measuring, analyzing and informing and/or signaling of measured values takes place by means of a computer. A thousand measurements per second and more can be made. This high measurement frequency makes determination of average values easy and increases the accuracy of the measurement.

The measurement of the wall thickness of the glass body, e.g. of a tube, the thickness of a bar or the thickness of a glass sheet formed in a plant for making flat glass, occurs as soon as possible after formation of the glass body. For this purpose a measurement is generally performed, when the glass body has reached its final form, which generally corresponds to a temperature below the softening temperature (softening point), at which the glass has a viscosity of $10^{6.6}$ Pa.s. Of course the glass naturally shrinks further when cooling from this temperature to room temperature. The dimensions measured in the hot glass do not correspond to the final dimensions and must be reduced by a factor, which corresponds to the shrinkage. However this is no problem since the temperature of the glass body during the measurement is known and the thermal expansion coefficients of the glass are also known.

In order to reduce the thermal load on the focusing device, the focusing device is maintained at temperatures under 120° C. by cooling. Furthermore the effects of heat radiation on the focusing device are blocked by providing a heat-blocking filter in the beam path between the hot glass and the focusing device. Heat-blocking filters are known and are used in great numbers in slid projectors, movie projectors, beamers and the like. They are characterized in that they pass visible light without hardly any intensity reduction, but are impermeable for infrared radiation (heat radiation). Heat-blocking filters operate according to two different principles. The first principle is that of reflection, the second is that of absorption. The side of a heat-blocking filter that faces the radiation source is provided with an IR reflecting coating, e.g. gold, platinum or a reflective layer packet (interference filter) in the case of a heat-blocking filter that operates according to the reflection principle. An absorptive heat-blocking filter comprises a glass, which has a suitable doping ingredient that largely absorbs the IR radiation. Since the latter filter is of course heated and thus must be cooled, it is advantageous to first put a reflecting heat-blocking filter in the beam path, by which up to 98% of the IR radiation can be reflected and following that, as needed, the remaining IR radiation passing through the reflective IR filter is absorbed by the following absorptive heat-blocking filter. Suitable filters operating by both filter principles are available in large numbers commercially.

In order to avoid aging effect on the focusing device it is advantageous when the temperature of the focusing device is maintained at a temperature of 20 to 100° C. In order to achieve good measurement accuracy the temperature of the focusing device should vary no more than ±10° C. from a set value. The method is suitable for determination of glass thickness in glasses, which have temperatures up to 1200° C. It is preferred to measure glass body dimensions, which have temperatures of from 200 to 1000° C.

When measuring tubes it is of advantage when the measurement occurs centered, i.e. the measurement beam impinges on the glass surface at an angle of 90° or, expressed another way, the measurement beam should pass through the tubing axis.

The accuracy of the measurement decreases when the measurement beam impinges on the tubing off-center, because angle errors occur, which lead to incorrect thickness results, due to the difference in the curvature of the inner wall in comparison to the outer wall. This error due to an off-center measurement beam becomes greater, the smaller the diameter of the tubing. Generally it can be said that with tubing with about 10 to 20 mm diameter and a wall thickness of about 0.4 to 1 mm a lateral displacement of about 0.5 to 1 mm leads to an error of about 2 µm from the actual thickness value. It is thus very important that the measurement beam always falls centered on the tube. If the measurement beam falls off-center not only measurement errors result, but also the intensity of the reflective light is less, since the light beam falls on the glass surface with an angle that differs from 90° and thus is not all reflected. If the measurement head is displaced transverse to the tube axis until the intensity of the reflected wavelength with the higher maxima reaches its maximum, the measurement beam is then centered on the tubing. This adjustment can be performed manually, however it is also possible to automate this adjustment by means of an adjusting motor and a corresponding computer program, so that the sensor is controlled to take its optimal position during operation.

The apparatus for performing the method for measuring the thickness of a hot glass body according to the invention is also part of the present invention.

According to the invention the apparatus for measuring a thickness of a hot glass body comprises a light source for a polychromatic white light beam;

a focusing device for focusing the light beam on the glass body;

a spectral analyzing device for analyzing reflected light from the glass body when the light beam is focused on the glass body;

a double-walled housing having an inlet and an outlet for a cooling liquid, the focusing device being arranged in the double-walled housing;

an observation port through which the light beam and the reflected light pass; and at least one heat-blocking filter.

In a preferred embodiment of the apparatus two resilient heat-resistant intervening rings are provided and the at least one heat-blocking filter is arranged between them. The two resilient heat-resistant intervening rings (19) are made of silicone rubber or a fluorocarbon resin.

In other advantageous embodiments a transparent window is arranged outside and in front of the at least one heat-blocking filter, and the transparent window comprises a corrosion-resistant material. Advantageously the transparent window comprises corundum or a fluorine-containing glass.

The apparatus also preferably includes means for supplying a rinsing gas including an inlet for the rinsing gas arranged in front of the observation port and a radiation protective sheet provided with a through-going opening for the light beam, which is arranged spaced a predetermined distance in the beam propagation direction from the housing.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
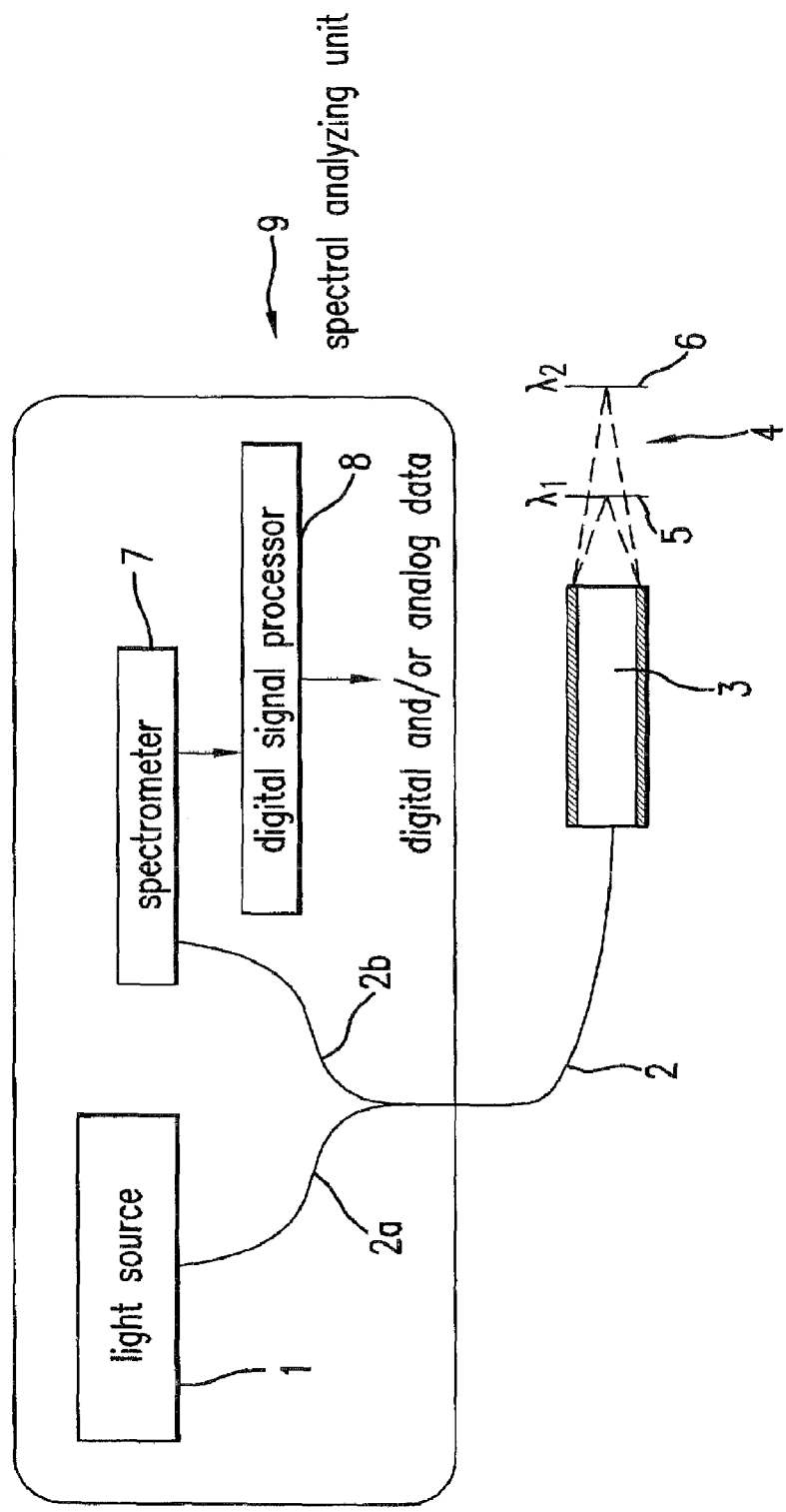
FIG. 1 is a diagrammatic illustration of a measurement apparatus for performing the measurement method according to the present invention.

FIG. 1 shows a measurement apparatus. Light from a polychromatic light source 1 is conducted by means of the strand 2a of the glass fiber optic cable 2, which comprises the glass fiber strands 2a and 2b, to the focusing device 3. The light propagated from the focusing device falls on the glass body 4, which has a front side 5 and a rear side 6 and which is to be measured. The focusing device 3 focuses light of different wavelengths at different distances from the light outlet. The light of wavelength λ1 is focused on the front side 5 of the glass body 4, while the light of wavelength λ2 is focused on the rear side 6 of the glass body 4. The light reflected from the glass body 4 travels over the strand 2b of the glass fiber optic cable 2 to the spectrometer 7. Since the intensity of the reflected light from the front side 5 is greatest at the wavelength λ1 and the intensity of the reflected light from the rear side 6 is greatest at the wavelength λ2, these wavelengths can be detected by the spectrometer with the help of their greater intensities in the spectrum. A digital signal processor 8 is connected to the spectrometer 7. The digital signal processor 8 makes the measurement results available in digital and/or analog form, e.g. by display of the measured thickness or by control signals for influencing the production process.

Figure 2:
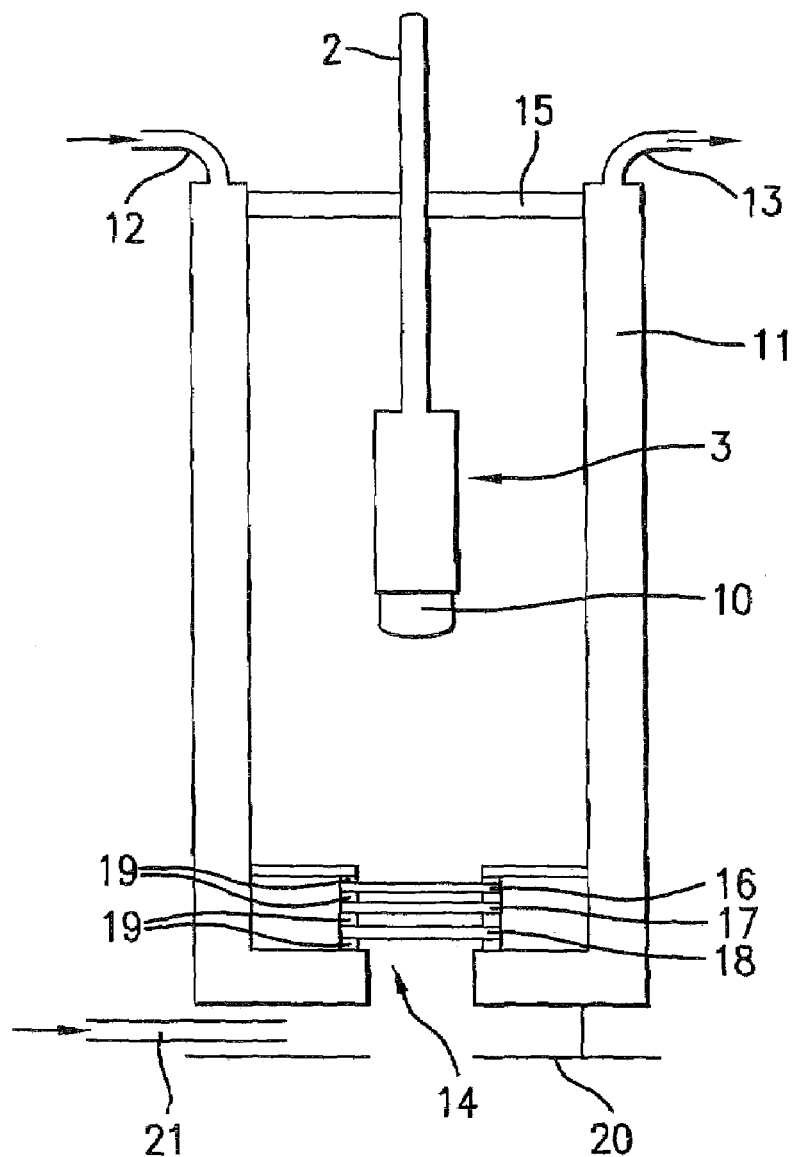
FIG. 2 is schematic cross-sectional view of a focusing device with its cooling housing used in the apparatus according to the invention.

In FIG. 2 a focusing device 3 is illustrated in its housing. This focusing device 3, which is provided with a lens 10, is connected by means of a glass fiber optic cable 2 with the spectral analyzing unit 9. The focusing device 3 is arranged within a double-walled housing 11, which is provided with coolant inlet 12 and coolant outlet 13 for cooling liquid, generally water. The housing 11 can be provided with an unillustrated, e.g. spiral structure or other means, in order to produce forced flow of cooling liquid and thus a uniform cooling of the entire housing 11. Furthermore the housing 11 is provided with an observation port 14, through which light from the focusing device 3 can pass to and from the object to be measured. The rear of the housing 11 is provided with a cover 15, through which the glass fiber optic cable 2 is guided to the outside. The focusing device 3 is fixed within the housing centered over the observation port 14 by an unshown attachment means, for example by three clamping screws protruding at an angle of 120° C. The interior of the housing 11 is protected from heat radiation by the IR absorption filter 16 and the IR reflection filter 17. It is possible to use only one IR filter when the load of IR radiation is small. The observation port 14 is also provided with a transparent disk 18, which prevents attack of reactive gas on the filter windows 16 and 17. These windows 18 can comprise corundum. The windows 16, 17 and 18 are arranged between resilient intervening rings 19, which have the functions of sealing the interior of the housing from the outside atmosphere and of compensating for stresses between the housing 11 and the windows 16, 17 and 18 due to different thermal expansion coefficients or different temperatures. Silicone rubber and elastic fluorocarbon resin were shown to be suitable materials for the rings 19. However other materials are also conceivable, as long as they have the required elasticity for stress reduction and the required temperature stability. The housing 11 can be provided further with a radiation protective sheet 20, which prevents heat radiation for directly reaching the housing. The radiation protective sheet 20, as usual for radiation protective sheets, is arranged so that it is spaced a certain distance in front of the object to be protected. The radiation protective sheet 20 can be a metal sheet, but it can also comprise a material that conducts heat poorly, for example a refractive oxide or a porous sintered metal plate. A rinsing gas, especially air, can be conducted through a tube 21, into the intervening space between the radiation protective sheet 20 and the housing 11, by which a gaseous cloud is formed in front of the observation port 14. Because of the formation of the gaseous cloud or fog admission of reactive gases into the observation port 14 or condensate formation from vaporized glass ingredients is prevented. The filters 16 and 17 and the window 18 are especially well protected when the rinsing gas is supplied.

With the methods and apparatus according to the invention for the first time wall thickness of a glass article (e.g. tubes, bars, lenses or flat glass) is directly measured after its manufacture at the hot end with the greatest accuracy or precision, i.e. immediately downstream of the roller machine in the rolling of flat glass and immediately in the float bath during manufacture of flat glass according to the float process. Lenses or lens blanks can be measured prior to their introduction to the cooling path in a test pass during the manufacture of lenses or lens blanks, so that wear of the press tool can be detected substantially sooner than is possible currently. Because of that faulty products produced in the production process can be detected substantially sooner and more rapidly, so that yield and quality of the products is increased.

While the invention has been illustrated and described as embodied in a method and apparatus for optical measurement of the thickness of a hot glass body by means of optical dispersion or chromatic aberration without direct contact with it, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of measuring a thickness of a glass body without direct contact with the glass body by means of optical dispersion immediately after production of the glass body, said method comprising the steps of:
    a) focusing a light beam from a polychromatic light source on the glass body by means of a focusing device immediately after forming the glass body;
    b) when the light beam is focused on the glass body, conducting reflected light from the glass body into a spectrometer in order to obtain a spectrum of the reflected light;
    c) finding two wavelengths of the reflected light from the front side and the rear side of the glass body respectively in the spectrum obtained in step b) at which reflected light intensities are greater than remaining wavelengths of the spectrum;
    d) determining the thickness of the glass body from a wavelength difference of said two wavelengths of higher intensity, considering a refractive index of the glass body;
    e) maintaining the focusing device at a temperature below 120° C. during the measuring of the thickness; and
    f) substantially preventing heat radiation from acting on the focusing device by means of at least one heat-blocking filter.

2. The method as defined in claim 1, wherein said temperature of said focusing device is from 20° C. to 100° C.

3. The method as defined in claim 1, wherein said temperature of said focusing device is kept constant within a tolerance range of ±10° C.

4. The method as defined in claim 1, wherein the measuring of the thickness of the glass body is performed when the glass body has a temperature of from 200° C. to 1100° C.

5. The method as defined in claim 1, further comprising moving the focusing device transversely to an optic axis of the focusing device in order to maximize the higher intensities of said two wavelengths during the measuring of the thickness of the glass body.

6. The method as defined in claim 1, further comprising forming a gaseous cloud or fog before the at least one heat-blocking filter in order to prevent admission of reactive gases or prevent condensate formation from vaporized glass ingredients.

7. An apparatus for measuring a thickness of a hot glass body, said apparatus comprising
 a light source (1) that generates a polychromatic white light beam;
 a focusing device (3) that focuses the polychromatic white light beam generated by the light source (1) on the hot glass body (4) to produce reflected light;
 a spectral analyzing device (9) that analyzes the reflected light from the hot glass body;
 a double-walled housing (11) having an inlet (12) and an outlet (13) through which a cooling liquid is passed, said focusing device (3) being arranged in the double-walled housing (11);
 an observation port (14) arranged in said double-walled housing (11) through which the polychromatic white light beam and the reflected light pass; and
 at least one heat-blocking filter (16,17) arranged in the observation port.

8. The apparatus as defined in claim 7, further comprising two resilient heat-resistant intervening rings (19) between which the at least one heat-blocking filter (17) is arranged in the observation port.

9. The apparatus as defined in claim 8, wherein said two resilient heat-resistant intervening rings (19) are made of silicone rubber or a fluorocarbon resin.

10. The apparatus as defined in claim 7, further comprising a transparent window (18) arranged in the observation port (14) on a side of the at least one heat-blocking filter opposite from the focusing device (3), and said transparent window comprises a corrosion-resistant material and prevents attack of reactive gas on the at least one heat-blocking filter.

11. The apparatus as defined in claim 10, wherein said transparent window comprises corundum or a fluorine-containing glass.

12. The apparatus as defined in claim 7, further comprising means for supplying a rinsing gas and wherein said means for supplying includes a tube (21) provided with an inlet for the rinsing gas arranged in front of the observation port (14).

13. The apparatus as defined in claim 7, further comprising a radiation protective sheet (20) provided with a through-going opening for the polychromatic white light beam and arranged spaced in a beam propagation direction from the double-walled housing (11).

14. The apparatus as defined in claim 13, further comprising means for supplying a rinsing gas including a tube (21), which is provided with an inlet for the rinsing gas and arranged between the double-walled housing and the radiation protective sheet (20).

15. The apparatus as defined in claim 7, wherein said focusing device (3) is arranged to receive said reflected light from said hot glass body as well as to focus said polychromatic white light beam on said hot glass body and wherein said spectral analyzing device (9) comprises a spectrometer (7) connected to said focusing device (3) to receive said reflected light and a signal processing device (8) connected to said spectrometer (7) to produce a thickness measurement result in digital or analog form or a digital or analog control signal according to the thickness of the hot glass body.

16. The apparatus as defined in claim 15, wherein said spectral analyzing device (9) includes said light source (1) and means for conducting said polychromatic white light beam from said light source (1) to said focusing device (3).

* * * * *